(12) United States Patent
Huang et al.

(10) Patent No.: US 12,305,317 B2
(45) Date of Patent: May 20, 2025

(54) DISPENSER, WATER INLET SYSTEM, AND LAUNDRY TREATMENT APPARATUS

(71) Applicant: WUXI LITTLE SWAN ELECTRIC CO., LTD., Wuxi (CN)

(72) Inventors: Shengye Huang, Wuxi (CN); Yaxin Zheng, Wuxi (CN); Jinyang Zhang, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 234 days.

(21) Appl. No.: 18/025,911

(22) PCT Filed: Nov. 30, 2020

(86) PCT No.: PCT/CN2020/132658
§ 371 (c)(1),
(2) Date: Mar. 12, 2023

(87) PCT Pub. No.: WO2022/052329
PCT Pub. Date: Mar. 17, 2022

(65) Prior Publication Data
US 2024/0011216 A1    Jan. 11, 2024

(30) Foreign Application Priority Data

Sep. 11, 2020  (CN) .......................... 202010955178.7

(51) Int. Cl.
*D06F 39/08*    (2006.01)
*D06F 39/02*    (2006.01)

(52) U.S. Cl.
CPC .......... *D06F 39/088* (2013.01); *D06F 39/028* (2013.01)

(58) Field of Classification Search
None
See application file for complete search history.

(56) References Cited

U.S. PATENT DOCUMENTS

2005/0252251 A1    11/2005  Rizzetto
2005/0262881 A1    12/2005  Rizzetto

FOREIGN PATENT DOCUMENTS

CN        1132808 A    10/1996
CN     201058940 Y     5/2008
(Continued)

OTHER PUBLICATIONS

Written Opinion mailed on Jun. 10, 2021 regarding PCT/CN2020/132658.
(Continued)

*Primary Examiner* — Cristi J Tate-Sims

(57) ABSTRACT

A dispenser, a water inlet system, and a laundry treatment apparatus. The dispenser includes a dispenser body; an X-shaped channel, the X-shaped channel being formed within the dispenser body, the X-shaped channel including a first channel and a second channel intersecting each other, the first channel including a first water inlet section and a first water outlet section, the second channel including a second water inlet section and a second water outlet section; a third channel, the third channel being arranged between the first water outlet section and the second water outlet section, the third channel being in communication with the X-shaped channel, and an inlet of the third channel being arranged at the intersection of the first channel and the second channel.

10 Claims, 6 Drawing Sheets

(56) References Cited

FOREIGN PATENT DOCUMENTS

| | | | | |
|---|---|---|---|---|
| CN | 206090095 U | 4/2017 | | |
| CN | 107653639 A | 2/2018 | | |
| CN | 107700156 A | 2/2018 | | |
| CN | 107794713 A | 3/2018 | | |
| CN | 109898292 A | 6/2019 | | |
| CN | 111101346 A | 5/2020 | | |
| EP | 2078779 A1 | 7/2009 | | |
| GB | 2353540 A * | 2/2001 | ......... | A47L 15/4217 |
| KR | 20080087363 A | 10/2008 | | |
| WO | WO-2015063005 A1 * | 5/2015 | ........... | D06F 39/028 |

OTHER PUBLICATIONS

First Office Action received in CN Application No. 202010955178.7; mailed Jun. 27, 2022.

ISR mailed Jun. 10, 2021 for PCT No. PCT/CN2020/132658.

* cited by examiner

DISPENSER, WATER INLET SYSTEM, AND LAUNDRY TREATMENT APPARATUS

CROSS-REFERENCES TO RELATED APPLICATIONS

The present disclosure is a national phase application of International Application No. PCT/CN2020/132658, filed on Nov. 30, 2020, which claims benefit of Chinese Patent Application No. 202010955178.7, filed on Sep. 11, 2020, the entireties of which are herein incorporated by reference.

FIELD

The disclosure relates to the field of household appliances, and in particular to a dispenser, a water inlet system and a laundry treatment apparatus.

BACKGROUND

The contents in this section are only background information relevant to the present disclosure and are not necessarily the prior art.

The water inlet system of the laundry treatment apparatus such as washing machine and washing and drying machine is generally used to distribute public tap water, and configured to allow tap water to flow into different detergent dispensers, and allow washing agents in the different detergent dispensers to be flushed into the washing drum of laundry treatment apparatus. Common washing agents include detergent powder or liquid detergent, softener, bleach, etc. In addition, the water inlet system is generally equipped with a spray box, which is configured to allow tap water directly to enter the washing drum without passing through the washing agent. In the related art, the water inlet system is provided with water channels, one of which leads to a spray box, and the others of which respectively lead to corresponding detergent drawers. In addition, in each water channel, a control valve is arranged, so as to enable the water channels to be controlled separately. The water inlet system with this structure needs a large number of control valves, which results in the complex structure and high cost of the water inlet system.

SUMMARY

The present disclosure aims at solving at least the above problems of laundry treatment apparatus in the prior art, i.e. complex structure and high cost of the water inlet system.

Embodiments of the present disclosure propose a dispenser including: a dispenser body; an X-shaped flow channel formed in the dispenser body, in which the X-shaped flow channel includes a first flow channel and a second flow channel intersecting with the first flow channel, the first flow channel includes a first water inlet section and a first water outlet section, and the second flow channel includes a second water inlet section and a second water outlet section; a third flow channel located between the first water outlet section and the second water outlet section, in which the third flow channel is in communication with the X-shaped flow channel, and an inlet of the third flow channel is disposed at an intersection of the first flow channel and the second flow channel.

The dispenser according to an embodiment of the present disclosure is provided with the X-shaped flow channel formed inside the dispenser body. When the dispenser is applied to the water inlet system of a laundry treatment apparatus, each of the first flow channel and the second flow channel of the X-shaped flow channel may be connected to a respective detergent dispenser, and a control valve may be installed at each of inlets of the first flow channel and the second flow channel. For example, the first flow channel is connected to a first detergent dispenser, and the second flow channel is connected to a second detergent dispenser. The first detergent dispenser and the second detergent dispenser are configured to accommodate different washing agents (e.g. liquid detergent, softener, etc.), and the first control valve is installed at the inlet of the first flow channel and the second control valve is installed at the inlet of the second flow channel. In the process of introducing water into the laundry treatment apparatus, when only the first control valve is opened, tap water enters into the first flow channel through the first control valve. When the water flow reaches the intersection of the X-shaped flow channel along the first flow channel, most part of the water flow will flow in its original flow direction and enter the first water outlet section, and another part of the water flow will enter the third flow channel. As such, most part of the water flow will enter into the first detergent dispenser to flush the washing agent in the first detergent dispenser into the washing drum of the laundry treatment apparatus, while another part of the water flow will enter into the spray box and is eventually sprayed by the spray box into the washing drum. Similarly, when only the second control valve is opened, tap water enters into the second flow channel through the second control valve, and eventually, most part of the water flow enters into the second detergent dispenser through the second water outlet section to flush the washing agent in the second detergent dispenser into the washing drum, and another part of the water flow is sprayed by the spray box into the washing drum. In addition, when the first control valve and the second control valve are both opened, tap water enters both the first flow channel and the second flow channel, and after two water flows are conflated at the intersection of the X-shaped flow channel, the conflated water flow enters into the spray box and eventually is sprayed into the washing drum. Thanks to the first control valve and the second control valve, water inflow modes respectively for flushing the first detergent dispenser, flushing the second detergent dispenser and spraying water can be realized. Compared with the existing water inlet system, fewer control valves are used, to simplify the structure and reducing the cost.

In addition, the dispenser according to the embodiment of the present disclosure may also have the following additional features:

In some embodiments of the present disclosure, the dispenser further includes a spray box. An interior of the spray box is in communication with the third flow channel. A water storing chamber is formed in the interior of the spray box. Water outlet holes in communication with the water storing chamber are arranged at a bottom of the spray box.

In some embodiments of the present disclosure, the dispenser further includes a first water inlet joint and a second water inlet joint that are disposed on the dispenser body. The first water inlet joint is disposed at an inlet of the first flow channel and the second water inlet joint is disposed at an inlet of the second flow channel.

In some embodiments of the present disclosure, the dispenser further includes a first water outlet joint and a second water outlet joint that are disposed on the dispenser body. The first water outlet joint is disposed at an outlet of the first flow channel and the second water outlet joint is disposed at an outlet of the second flow channel.

In some embodiments of the present disclosure, the dispenser further includes a hot water pipe joint arranged on the spray box.

In some embodiments of the present disclosure, the first water inlet section and the second water inlet section are arranged in an axisymmetric manner. A distance is provided between a central axis of the third flow channel and a symmetry axis of the first water inlet section and the second water inlet section and the central axis of the third flow channel is closer to the second water outlet section than to the first water outlet section.

Embodiments of the present disclosure propose a water inlet system including: a dispenser of any of the above embodiments; a first control valve installed at an inlet of the first flow channel; a second control valve installed at an inlet of the second flow channel; a first detergent dispenser connected with the first flow channel; and a second detergent dispenser connected with the second flow channel.

In addition, the water inlet system according to the embodiment of the present disclosure may also have the following additional features:

In some embodiments of the present disclosure, the water inlet system further includes a first water inlet member. A first water inlet passage and a second water inlet passage are formed in an interior of the first water inlet member. The first water inlet member is provided with a water inlet port in communication with both of the first and second water inlet passages. The first water inlet passage is connected to the first control valve, and the second water inlet passage is connected to the second control valve.

In some embodiments of the present disclosure, the water inlet system further includes: a first hose, one end of which is connected with an outlet of the first flow channel, and another end of which is connected with the first detergent dispenser; a second hose, one end of which is connected with an outlet of the second flow channel, and another end of which is connected with the second detergent dispenser.

In some embodiments of the present disclosure, the water inlet system further includes a third control valve and a second water inlet member, a third water inlet passage is formed in an interior of the second water inlet member, the second water inlet member is provided with a water inlet port in communication with the third water inlet passage, the third water inlet passage is connected to the third control valve; the dispenser further includes a hot water pipe joint arranged on the spray box, the hot water pipe joint is connected to the third control valve.

Embodiments of the present disclosure provide a laundry treatment apparatus including the water inlet system of any of the above embodiments.

BRIEF DESCRIPTION OF THE DRAWINGS

The embodiments of the present disclosure will become apparent and easy to be understood from the following description, with reference to the accompanying drawings in which.

LIST OF REFERENCE SYMBOLS

Figure 1:
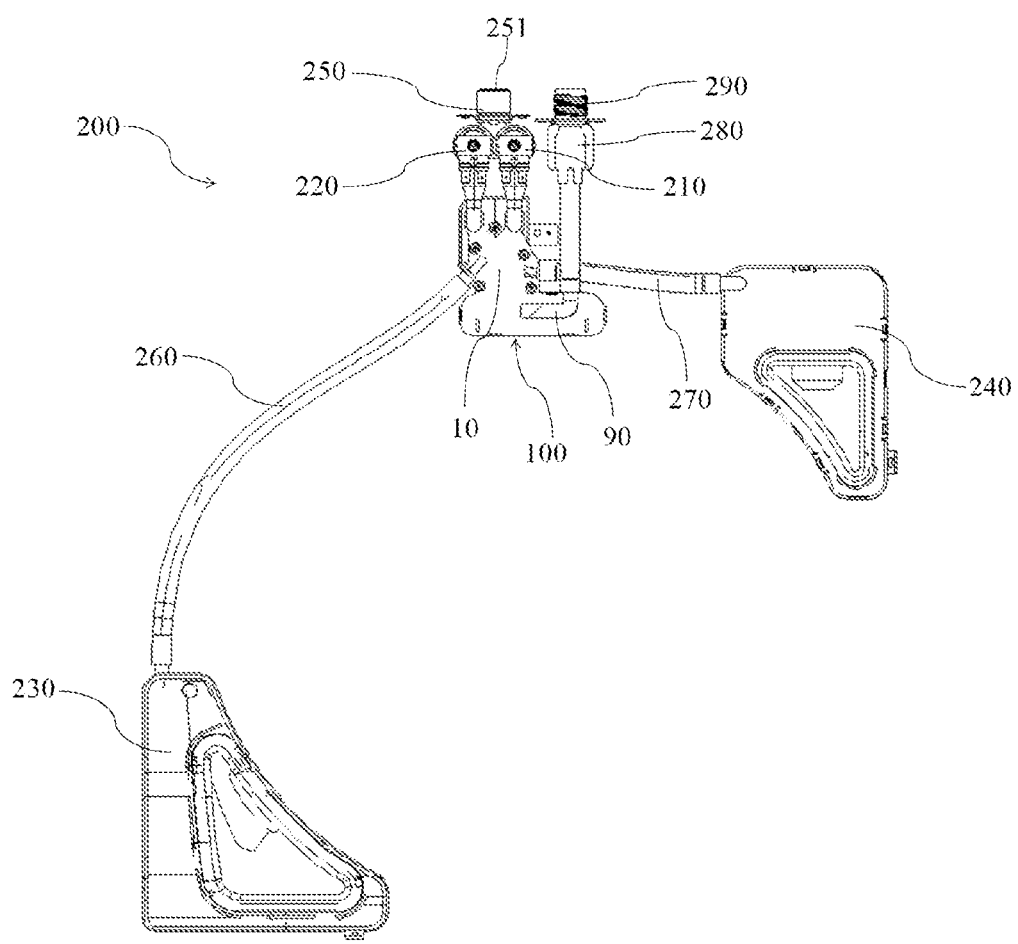
FIG. 1 is a schematic view of a water inlet system according to an embodiment of the present disclosure.
Figure 2:
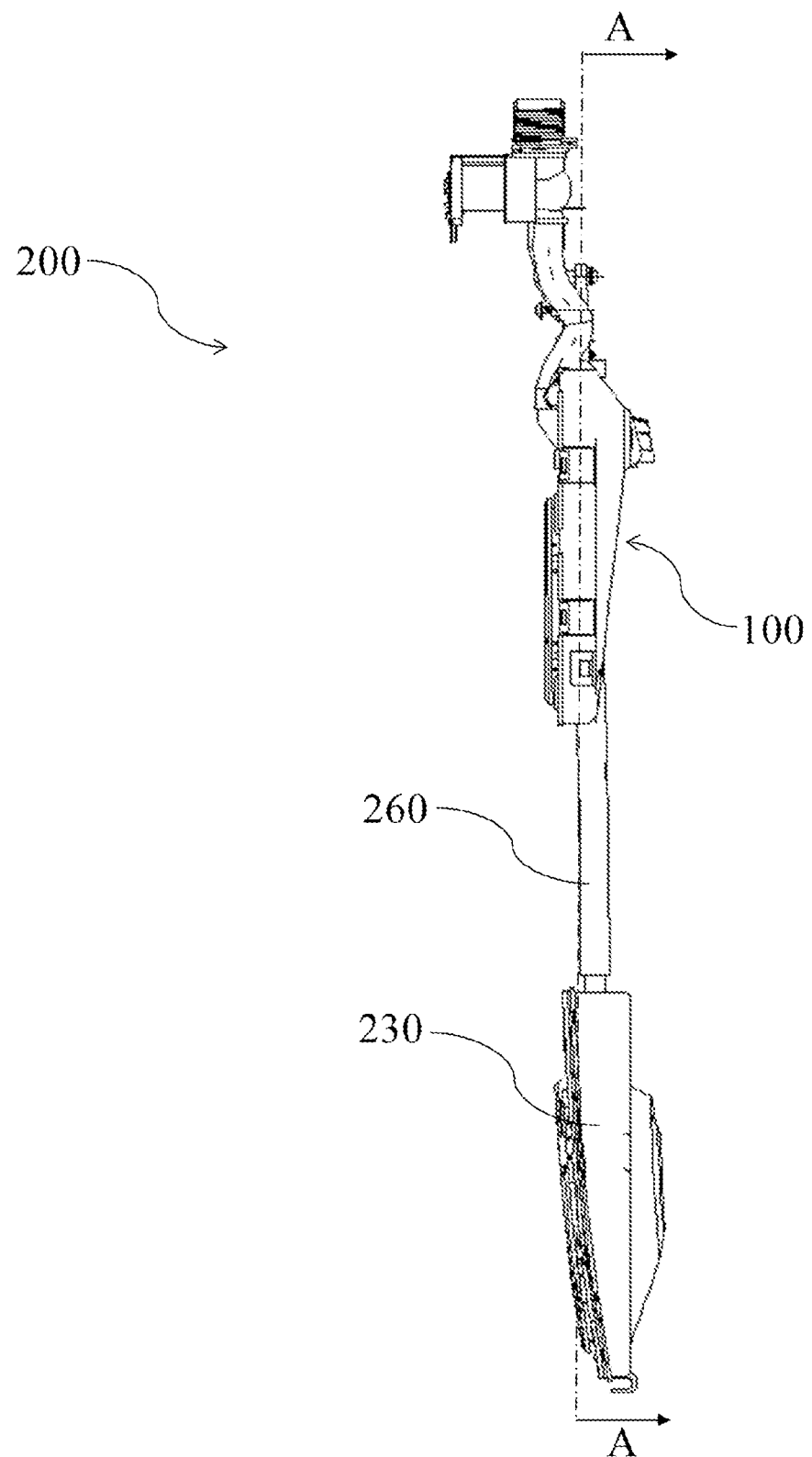
FIG. 2 is a schematic side view of a water inlet system according to an embodiment of the present disclosure.
Figure 3:
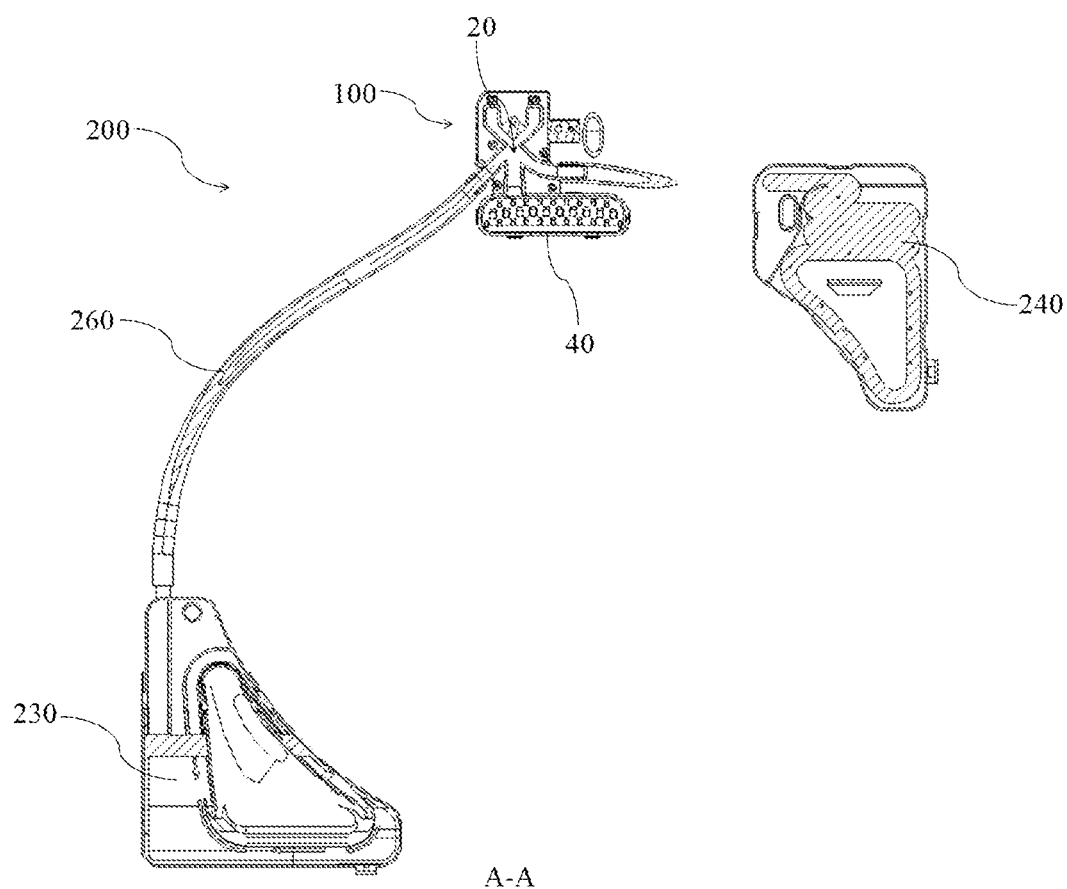
FIG. 3 is a schematic view along a section A-A of the structure shown in FIG. 2.
Figure 4:
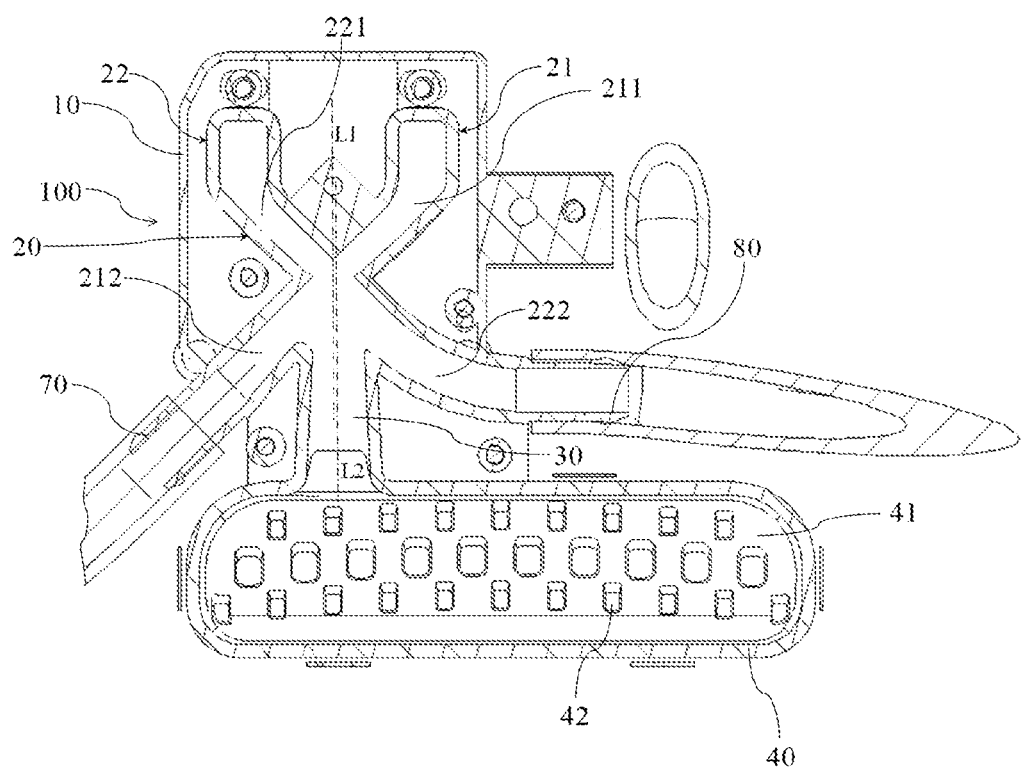
FIG. 4 is a partial enlarged view of the structure in FIG. 3.

100: dispenser;
10: dispenser body;
20: X-shaped flow channel;
21: first flow channel, 211: first water inlet section, 212: first water outlet section, 22: second flow channel, 221: second water inlet section, 222: second water outlet section;
30: third flow channel;
40: spray box;
41: water storing chamber, 42: water outlet hole;
50: first water inlet joint;
60: second water inlet joint;
70: first water outlet joint;
80: second water outlet joint;
90: hot water pipe joint;
200: water inlet system;
210: first control valve, 220: second control valve, 230: first detergent dispenser, 240: second detergent dispenser, 250: first water inlet member, 251: water inlet port, 260: first hose, 270: second hose, 280: third control valve, 290: second water inlet member

DETAILED DESCRIPTION OF THE DISCLOSURE

Exemplary embodiments of the present disclosure will be described in more detail below with reference to the accompanying drawings. While the drawings shows exemplary embodiments of the present disclosure, it should be understood that the present disclosure may be implemented in various ways and should not be limited by the embodiments set forth herein.

It should be understood that the terms used herein are for the purpose of describing some embodiments only and are not intended to limit the present disclosure. As used herein, the singular forms "a", "an" and "the" are intended to include the plural forms as well, unless the context clearly indicates otherwise. The words "include" "comprise", "contain" and "have" are inclusive, and thus indicate the presence of the stated features, steps, operations, elements, and/or components, and they are not intended to (and do not) exclude the presence or addition of other features, steps, operations, elements, components and/or combinations thereof. The method steps, procedures, and operations described herein are not to be construed as having to be performed in the particular order in which they are described or illustrated, unless the order of performance is explicitly stated. It should also be understood that additional or alternative steps may be conceived.

Although the terms "first", "second" and "third" can be used to describe various elements, components, regions, layers, and/or sections, these elements, components, regions, layers, and/or sections are limited by above terms. The above terms serve solely to differentiate one element, component, region, layer or section from another region, layer or section. Unless the context clearly indicates, the terms "first" and "second" and other numeric terms used herein do not imply any order or sequence between these elements. Thus, the first element, component, region, layer or section discussed below may be referred to as a second element, component, region, layer or section without departing from the teachings of the embodiment.

For ease of description, spatial relative relation terms, such as "inside", "outside", "inner", "outer", "below", "under", "above", "over" and the like, may be used herein to describe the relation of one element or feature with respect to another element or feature as shown in the figures. This spatial relative relation term is intended to include different orientations of the device in use or operation other than those illustrated in the figures. For example, if the device in the figures is turned upside down, the element described as "under or below another element or feature" will then be oriented as "above or over another element or feature". Thus, the term "below" may include the case of both the upward and downward orientations. The device may be oriented in another direction (rotated by 90 degrees or in other directions), and the spatial relative relation term used herein should be interpreted accordingly.

As shown in FIGS. 1-4, an embodiment of the present disclosure proposes a dispenser 100 including a dispenser body 10, an X-shaped flow channel 20, and a third flow channel 30. The X-shaped flow channel 20 is formed in the dispenser body 10. The X-shaped flow channel 20 includes a first flow channel 21 and a second flow channel 22 intersecting with the first flow channel. The first flow channel 21 includes a first water inlet section 211 and a first water outlet section 212. The second flow channel 22 includes a second water inlet section 221 and a second water outlet section 222. The third flow channel 30 located between the first water outlet section 212 and the second water outlet section 222 is in communication with the X-shaped flow channel 20, and an inlet of the third flow channel 30 is disposed at the intersection of the first flow channel 21 and the second flow channel 22.

The dispenser 100 according to an embodiment of the present disclosure is provided with the X-shaped flow channel 20 formed inside the dispenser body 10. When the dispenser 100 is applied to a water inlet system of a laundry treatment apparatus (such as washing machine, washing and drying machine, etc.), each of the first flow channel 21 and the second flow channel 22 of the X-shaped flow channel 20 may be connected to a respective detergent dispenser, the third flow channel 30 may be connected to a spray structure (e.g. spray box 40), and a control valve may be installed at each of the inlets of the first flow channel 21 and the second flow channel 22. For example, the first flow channel 21 is connected to a first detergent dispenser 230, and the second flow channel 22 is connected to a second detergent dispenser 240. The first detergent dispenser 230 and the second detergent dispenser 240 are configured to accommodate different washing agents (e.g. liquid detergent, softener, etc.), and the first control valve 210 is installed at the inlet of the first flow channel 21 and the second control valve 220 is installed at the inlet of the second flow channel 22.

In the process of introducing water into the laundry treatment apparatus, when only the first control valve 210 is opened, tap water enters into the first flow channel 21 through the first control valve 210. When the water flow reaches the intersection of the X-shaped flow channel 20 along the first flow channel 21, most part of the water flow will flow in its original flow direction and enter the first water outlet section 212, and another part of the water flow will enter the third flow channel 30. As such, most part of the water flow will enter into the first detergent dispenser 230 to flush the washing agent in the first detergent dispenser 230 into the washing drum of the laundry treatment apparatus, while another part of the water flow will enter into the spray box 40 and is eventually sprayed by the spray box 40 into the washing drum. Similarly, when only the second control valve 220 is opened, tap water enters into the second flow channel 22 through the second control valve 220, and eventually, most part of the water flow enters into the second detergent dispenser 240 through the second water outlet section 222 to flush the washing agent in the second detergent dispenser 240 into the washing drum, and another part of the water flow is sprayed by the spray box 40 into the washing drum. In addition, when the first control valve 210 and the second control valve 220 are both opened, tap water enters both the first flow channel 21 and the second flow channel 22, and after two water flows are conflated at the intersection of the X-shaped flow channel 20, the conflated water flow enters into the spray box 40 and is sprayed into the washing drum.

Thanks to the first control valve 210 and the second control valve 220, water inflow modes respectively for flushing the first detergent dispenser 230, flushing the second detergent dispenser 240 and spraying water can be realized. Compared with the existing water inlet system, fewer control valves are used, to simplify the structure and reducing the cost.

In some embodiments of the present disclosure, the dispenser 100 further includes a spray box 40. An interior of the spray box 40 is in communication with the third flow channel 30. A water storing chamber 41 for accommodating tap water is formed inside the spray box 40, and water outlet holes 42 in communication with the water storing chamber 41 are provided at a bottom of the spray box 40. The spray box 40 is configured to spray tap water into the washing drum of the laundry treatment apparatus. Before washing clothes by laundry treatment apparatus, the clothes placed in washing drum can be wet more comprehensively and evenly. In addition, in the process of rinsing clothes by laundry treatment apparatus, rinsing can also be realized by water spraying, which can not only save water, but also obtain better rinsing effect.

In particular, the spray box 40 may be a generally rectangular box having a length and the sprayed water can cover a length range. The spray box 40 may be assembled to the third flow channel 30, or may be made in one piece with the dispenser body 10 during the manufacturing process, depending on actual conditions.

Figure 5:
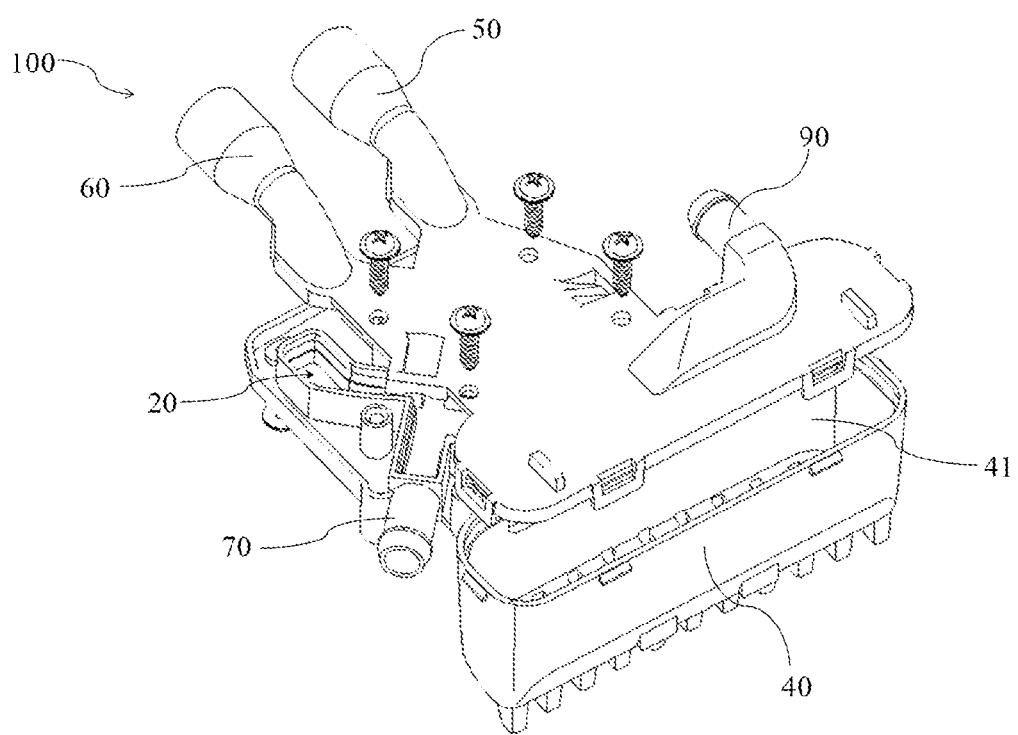
FIG. 5 is a schematic view of a dispenser according to an embodiment of the present disclosure.
Figure 6:
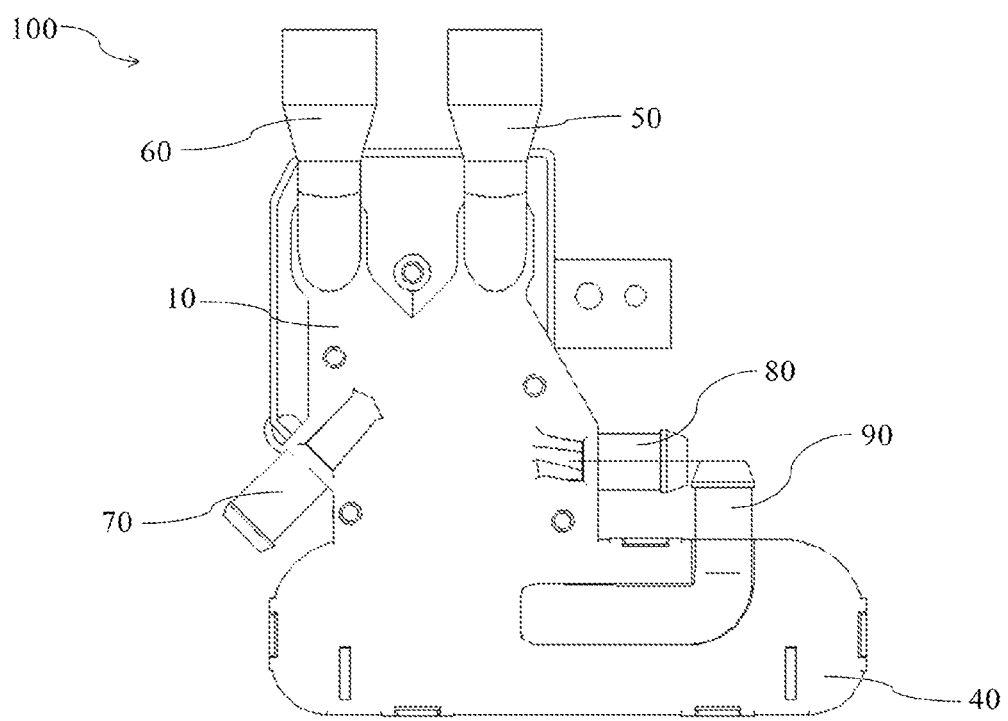
FIG. 6 is a schematic top view of a dispenser according to an embodiment of the present disclosure.

In some embodiments of the present disclosure, as shown in FIGS. 5 and 6, the dispenser 100 further includes a first water inlet joint 50 and a second water inlet joint 60 disposed on the dispenser body 10. The first water inlet joint 50 is disposed at an inlet of the first flow channel 21, and the second water inlet joint 60 is disposed at an inlet of the second flow channel 22. The first water inlet joint 50 allows the connection between the inlet end of the first flow channel 21 and an external pipeline. In one embodiment, the first control valve 210 is connected to the first water inlet joint 50 to achieve the connection between the first control valve 210 and the inlet of the first flow channel 21, to enable the first control valve 210 to control the opening and closing of the first flow channel 21. Similarly, the second water inlet joint 60 allows the connection between the inlet end of the second flow channel 22 and an external pipeline. In one embodiment, the second control valve 220 is connected to the second water inlet joint 60 to achieve the connection between the second control valve 220 and the inlet of the second flow channel 22, to enable the second control valve 220 to control the opening and closing of the second flow channel 22.

Further, the inlet ends of the first water inlet joint 50 and the second water inlet joint 60 can be provided with internal threads or external threads, and each of the first water inlet joint and the second water inlet joint can be connected with the external pipeline by threaded connection, which is convenient to operate and beneficial to improving assembly efficiency. In addition, in order to ensure the sealing between the connected pipes, a seal member (e.g. a rubber seal ring) can be provided at each of the connection points between the first and second water inlet joints 50, 60 and the external pipeline, and the problem of water leakage at the connection points can be avoided.

In some embodiments of the present disclosure, the dispenser 100 further includes a first water outlet joint 70 and a second water outlet joint 80 disposed on the dispenser body 10. The first water outlet joint 70 is disposed at an outlet of the first flow channel 21, and the second water outlet joint 80 is disposed at an outlet of the second flow channel 22. The first water outlet joint 70 is configured to connect the outlet end of the first flow channel 21 with an external pipeline. In one embodiment, the first water outlet joint 70 is connected to a hose in communication with the first detergent dispenser 230, and the connection between the first flow channel 21 and the first detergent dispenser 230 can be achieved. Similarly, the second water outlet joint 80 is configured to connect the outlet end of the second flow channel 22 with an external pipeline. In one embodiment, the second water outlet joint 80 is connected to a hose in communication with the second detergent dispenser 240, and the connection between the second flow channel 22 and the second detergent dispenser 240 can be achieved.

Further, the outlet ends of the first water outlet joint 70 and the second water outlet joint 80 can be provided with internal threads or external threads, and each of the first water outlet joint and the second water outlet joint can be connected with the external pipeline by threaded connection, which is convenient to operate and beneficial to improving assembly efficiency. In addition, in order to ensure the sealing between the connected pipes, a seal member (e.g. a rubber seal ring) can be provided at each of the connection points between the first and second water outlet joints 70, 80 and the external pipelines, and the problem of water leakage at the connection points can be avoided.

In some embodiments of the present disclosure the dispenser 100 further includes a hot water pipe joint 90 disposed on the spray box 40. The hot water pipe joint 90 may be connected to an external hot water source through a water pipe, and the hot water can be introduced into the laundry treatment apparatus, and the water channel for the hot water and the water channel for tap water (cold water) are independent from each other. In particular, when the hot water is introduced, the hot water supplied by the external hot water source directly enters into the spray box 40 through the hot water pipe joint 90, and then is sprayed into the washing drum of the laundry treatment apparatus. In this embodiment, hot water can be introduced into the laundry treatment apparatus. By controlling the ratio between the hot water and tap water entering into the washing drum, the temperature of washing water can be adjusted, to allow the temperature of washing water to be in a better temperature range, thus improving the cleaning effect.

In some embodiments of the present disclosure, the first water inlet section 211 and the second water inlet section 221 are arranged in an axisymmetric manner. A distance is provided between a central axis L2 of the third flow channel 30 and a symmetry axis L1 of the first water inlet section 211 and the second water inlet section 221, and the central axis L2 of the third flow channel 30 is closer to the second water outlet section 222 than to the first water outlet section 212. In this embodiment, the central axis L2 of the third flow channel 30 is substantially parallel to the symmetry axis L1 of the first water inlet section 211 and the second water inlet section 221. In the case that the flow rate of the first water inlet section 211 is substantially equal to that of the second water inlet section 221, the water flows in the first water inlet section 211 and the second water inlet section 221 are conflated after meeting at the intersection of the X-shaped flow channel 20, and then flow in a direction substantially parallel to the symmetry axis L1 of the first water inlet section 211 and the second water inlet section 221. Therefore, by arranging the central axis L2 of the third flow channel 30 parallel to the symmetry axis L1, the conflated water flow can smoothly enter into the third flow channel. In addition, there is a distance between the central axis L2 of the third flow channel 30 and the symmetry axis L1 of the first water inlet section 211 and the second water inlet section 221 (that is, the central axis L2 of the third flow channel 30 is not collinear with the symmetry axis L1), and the third flow channel 30 is offset from the symmetry axis L1 by a distance. In one embodiment, the central axis L2 of the third flow channel 30 is closer to the second water outlet section 222 than to the first water outlet section 212. The reason for this arrangement is that, in the case that the second detergent dispenser 240 to which the second flow channel 22 is connected is used to contain the softener that is usually flushed into the washing drum at the last rinse, there is a need to ensure that no water flows into the second water outlet section 222 during previous rinses and earlier washing procedures, that is, there is a need to prevent water flowing through the first flow channel 21 or through the third flow channel 30 from accidentally entering into the second water outlet section 222. In practice, the water pressure of the water flowing into the first flow channel 21 is slightly different from the water pressure of the water flowing into the second flow channel 22. Therefore, the water flowing into the first flow channel 21 and the water flowing into the second flow channel 22 are conflated at the intersection of the X-shaped flow channel 20, and the conflated water does not flow completely along the central axis L2 of the third flow channel, but shifts towards the first water outlet section 212 or the second water outlet section 222. In this embodiment, the third flow channel 30 is offset in a direction toward the second water outlet section 222, and the inlet of the second water outlet section 222 is further from the water flow intersection, to minimize the likelihood that the water flow passing through the first flow channel 21 accidentally enters into the second water outlet section 222.

An embodiment of the present disclosure proposes a water inlet system 200 including a dispenser, a first control valve 210, a second control valve 220, a first detergent dispenser 230 and a second detergent dispenser 240. The dispenser is the dispenser 100 in any of the above embodiments, the first control valve 210 is installed at the inlet of the first flow channel 21, the second control valve 220 is installed at the inlet of the second flow channel 22, the first detergent dispenser 230 is connected to the first flow channel 21, and the second detergent dispenser 240 is connected to the second flow channel 22.

The dispenser 100 of the water inlet system 200 according to an embodiment of the present disclosure is provided with the X-shaped flow channel 20 formed inside the dispenser body 10. In the case that the water inlet system 200 is applied to the laundry treatment apparatus, when only the first control valve 210 is opened, tap water enters into the first flow channel 21 through the first control valve 210. When the water flow reaches the intersection of the X-shaped flow channel 20 along the first flow channel 21, most part of the water flow will flow in its original flow direction and enter the first water outlet section 212, and another part of the water flow will enter the third flow channel 30. As such, most part of the water flow will enter into the first detergent dispenser 230 to flush the washing agent in the first detergent dispenser 230 into the washing drum of the laundry treatment apparatus, while another part of the water flow will enter into the spray box 40 and is eventually sprayed by the spray box 40 into the washing drum. Similarly, when only the second control valve 220 is opened, tap water enters into the second flow channel 22 through the second control valve 220, and eventually, most part of the water flow enters into the second detergent dispenser 240 through the second water outlet section 222 to flush the washing agent in the second detergent dispenser 240 into the washing drum, and another part of the water flow is sprayed by the spray box 40 into the washing drum. In addition, when the first control valve 210 and the second control valve 220 are both opened, tap water enters both the first flow channel 21 and the second flow channel 22, and after two water flows are conflated at the intersection of the X-shaped flow channel 20, the conflated water flow enters into the spray box 40 and is sprayed into the washing drum. Thanks to the first control valve 210 and the second control valve 220, water inflow modes respectively for flushing the first detergent dispenser 230, flushing the second detergent dispenser 240 and spraying water and so on can be realized. Compared with the existing water inlet system, fewer control valves are used, to simplify the structure and reducing the cost.

It will be understood that the first detergent dispenser 230 and the second detergent dispenser 240 are used to receive different washing agents. In a more common embodiment, the first detergent dispenser 230 is used for receiving liquid detergent or detergent powder, and the second detergent dispenser 240 is used for receiving softener. The addition of the softener in the rinsing process of clothes can reduce the friction coefficient between fibers, and restore the inherent smoothness, elongation and compression properties of fibers, thus making clothes soft, fluffy and elastic.

In some embodiments of the present disclosure, the water inlet system 200 further includes a first water inlet member 250. A first water inlet passage and a second water inlet passage are formed inside the first water inlet member 250. The first water inlet member 250 is provided with a water inlet port 251 in communication with both of the first and second water inlet passages. The first water inlet passage is connected to the inlet of the first control valve 210, and the second water inlet passage is connected to the inlet of the second control valve 220. In this embodiment, the first water inlet member 250 may serve as a water inlet end of the water inlet system 200 and can divert the tap water. In one embodiment, the external tap water is diverted into two parts after entering into the first water inlet member 250 through the water inlet port 251, one part reaches the first control valve 210 through the first water inlet passage and the other part reaches the second control valve 220 through the second water inlet passage. In this embodiment, tap water is diverted into two parts by the first water inlet member 250, and the number of external pipes thus can be reduced. That is to say, the water inlet port 251 can be connected with the tap by only one external hose, thus reducing the burden on users to connect the pipes when installing the laundry treatment apparatus.

In some embodiments of the present disclosure, the water inlet system 200 also includes a first hose 260 and a second hose 270. One end of the first hose 260 is connected to the outlet of the first flow channel 21, the other end of the first hose 260 is connected to the first detergent dispenser 230. One end of the second hose 270 is connected to the outlet of the second flow channel 22, and the other end of second hose 270 is connected to the second detergent dispenser 240. In the present embodiment, the first detergent dispenser 230 and the first flow channel 21 are connected to one another by the first hose 260, and the second detergent dispenser 240 and the second flow channel 22 are connected to one another by the second hose 270. Therefore, the first detergent dispenser 230 and the second detergent dispenser 240 can be arranged at appropriate positions in laundry treatment apparatus according to design needs, without being limited to positions adjacent to the dispenser 100, to provide a larger design freedom for structural design of laundry treatment apparatus. In addition, the first hose 260 and the second hose 270 are arranged in such a way that the flow path of the water flow becomes longer, and the water flow is subject to higher resistance when flowing towards the first detergent dispenser 230 or the second detergent dispenser 240. In this way, it is more helpful to divert the water flow flowing towards the first detergent dispenser 230 or the second detergent dispenser 240 at the intersection of the X-shaped flow channel 20, and part of the water flow will flow into the third flow channel 30. Therefore, it is ensured that the water flow will enter into the washing drum of laundry treatment apparatus through the spray box 40 under various water inflow modes, thus maintaining the effect of spraying water on clothes.

In some embodiments of the present disclosure, the water inlet system 200 further includes a third control valve 280 and a second water inlet member 290. A third water inlet passage is formed in an interior of the second water inlet member 290. The second water inlet member 290 is provided with a water inlet port 291 in communication with the third water inlet passage, and the third water inlet passage is connected to an outlet of the third control valve 280. The dispenser 100 also includes a hot water pipe joint 90 disposed on the spray box 40. The hot water pipe joint 90 is connected to an inlet of the third control valve 280. In the embodiment, the water inlet system 200 can also introduce hot water to the laundry treatment apparatus through the second water inlet member 290, the third control valve 280 and the hot water pipe joint 90. In one embodiment, the external hot water source may be connected to the second water inlet member 290 by a pipeline. The third control valve 280 is configured to control the opening and closing of the hot water channel. When the third control valve 280 is in an open state, the hot water supplied from the external hot water source sequentially passes through the second water inlet member 290, the third control valve 280 and the hot water pipe joint 90 to enter into the spray box 40, and then is sprayed into washing drum of the laundry treatment apparatus. The water inlet system 200 of the embodiment can adjust the temperature of washing water by controlling the ratio between the hot water and tap water entering into the washing drum, to allow the temperature of washing water to be in a better temperature range, thus improving the cleaning effect.

Embodiments of the present disclosure provide a laundry treatment apparatus (e.g. a washing machine, a washing and drying machine, etc.) including the water inlet system 200 of any of the above embodiments.

In the laundry treatment apparatus according to the embodiment of the present disclosure, when only the first control valve 210 is opened, tap water enters into the first flow channel 21 through the first control valve 210. When the water flow reaches the intersection of the X-shaped flow channel 20 along the first flow channel 21, most part of the water flow will flow in its original flow direction and enter the first water outlet section 212, and another part of the water flow will enter the third flow channel 30. As such, most part of the water flow will enter into the first detergent dispenser 230 to flush the washing agent in the first detergent dispenser 230 into the washing drum of the laundry treatment apparatus, while another part of the water flow will enter into the spray box 40 and is eventually sprayed by the spray box 40 into the washing drum. Similarly, when only the second control valve 220 is opened, tap water enters into the second flow channel 22 through the second control valve 220, and eventually, most part of the water flow enters into the second detergent dispenser 240 through the second water outlet section 222 to flush the washing agent in the second detergent dispenser 240 into the washing drum, and another part of the water flow is sprayed by the spray box 40 into the washing drum. In addition, when the first control valve 210 and the second control valve 220 are both opened, tap water enters both the first flow channel 21 and the second flow channel 22, and after two water flows are conflated at the intersection of the X-shaped flow channel 20, the conflated water flow enters into the spray box 40 and is sprayed into the washing drum. Thanks to the first control valve 210 and the second control valve 220, water inflow modes respectively for flushing the first detergent dispenser 230, flushing the second detergent dispenser 240 and spraying water, etc. can be realized. Compared with the existing water inlet system, fewer control valves are used, to simplify the structure and reducing the cost.

What is claimed is:

1. A dispenser, comprising:
   a dispenser body;
   an X-shaped flow channel formed in the dispenser body, the X-shaped flow channel comprising a first flow channel and a second flow channel intersecting with the first flow channel, the first flow channel comprising a first water inlet section and a first water outlet section, the second flow channel comprising a second water inlet section and a second water outlet section;
   a third flow channel located between the first water outlet section and the second water outlet section, the third flow channel being in communication with the X-shaped flow channel, an inlet of the third flow channel being disposed at an intersection of the first flow channel and the second flow channel; and
   a spray box, an interior of the spray box being in communication with the third flow channel, a water storing chamber being formed in the interior of the spray box, and a plurality of water outlet holes in communication with the water storing chamber being arranged at a bottom of the spray box.

2. The dispenser according to claim 1, wherein the dispenser further comprises a first water inlet joint and a second water inlet joint that are disposed on the dispenser body, the first water inlet joint being disposed at an inlet of the first flow channel and the second water inlet joint being disposed at an inlet of the second flow channel.

3. The dispenser according to claim 1, wherein the dispenser further comprises a first water outlet joint and a second water outlet joint that are disposed on the dispenser body, the first water outlet joint being disposed at an outlet of the first flow channel and the second water outlet joint being disposed at an outlet of the second flow channel.

4. The dispenser according to claim 1, wherein the dispenser further comprises a hot water pipe joint arranged on the spray box.

5. The dispenser according to claim 1, wherein the first water inlet section and the second water inlet section are arranged in an axisymmetric manner, a distance being provided between a central axis of the third flow channel and a symmetry axis of the first water inlet section and the second water inlet section such that the central axis of the third flow channel is closer to the second water outlet section than to the first water outlet section.

6. A water inlet system, comprising:
   a dispenser, the dispenser comprising:
   a dispenser body;
   an X-shaped flow channel formed in the dispenser body, the X-shaped flow channel comprising a first flow channel and a second flow channel intersecting with the first flow channel, the first flow channel comprising a first water inlet section and a first water outlet section, the second flow channel comprising a second water inlet section and a second water outlet section;
   a third flow channel located between the first water outlet section and the second water outlet section, the third flow channel being in communication with the X-shaped flow channel, an inlet of the third flow channel being disposed at an intersection of the first flow channel and the second flow channel;
   a first control valve installed at an inlet of the first flow channel;
   a second control valve installed at an inlet of the second flow channel;
   a first washing agent drawer connected with the first flow channel;
   a second washing agent drawer connected with the second flow channel; and
   a spray box, an interior of the spray box being in communication with the third flow channel, a water storing chamber being formed in the interior of the spray box, and a plurality of water outlet holes in communication with the water storing chamber being arranged at a bottom of the spray box.

7. The water inlet system according to claim 6, wherein the water inlet system further comprises a first water inlet member, a first water inlet passage and a second water inlet passage being formed in an interior of the first water inlet member, the first water inlet member being provided with a water inlet port in communication with both of the first and second water inlet passages, the first water inlet passage being connected to the first control valve, and the second water inlet passage being connected to the second control valve.

8. The water inlet system according to claim 6, wherein the water inlet system further comprises:
   a first hose, one end of which is connected with an outlet of the first flow channel, and another end of which is connected with the first washing agent drawer; and
   a second hose, one end of which is connected with an outlet of the second flow channel, and another end of which is connected with the second washing agent drawer.

9. The water inlet system according to claim 6, wherein the water inlet system further comprises a third control valve and a second water inlet member, a third water inlet passage being formed in an interior of the second water inlet member, the second water inlet member being provided with a water inlet port in communication with the third water inlet passage, and the third water inlet passage being connected to the third control valve;

the dispenser further comprises a hot water pipe joint arranged on the spray box, wherein the hot water pipe joint being connected to the third control valve.

10. A laundry treatment apparatus comprising:

a water inlet, comprising a dispenser;

wherein the dispenser comprises:

a dispenser body;

an X-shaped flow channel formed in the dispenser body, the X-shaped flow channel comprising a first flow channel and a second flow channel intersecting with the first flow channel, the first flow channel comprising a first water inlet section and a first water outlet section, the second flow channel comprising a second water inlet section and a second water outlet section;

a third flow channel located between the first water outlet section and the second water outlet section, the third flow channel being in communication with the X-shaped flow channel, an inlet of the third flow channel being disposed at an intersection of the first flow channel and the second flow channel;

a first control valve installed at an inlet of the first flow channel;

a second control valve installed at an inlet of the second flow channel;

a first washing agent drawer connected with the first flow channel;

a second washing agent drawer connected with the second flow channel; and a spray box, an interior of the spray box being in communication with the third flow channel, a water storing chamber being formed in the interior of the spray box, and a plurality of water outlet holes in communication with the water storing chamber being arranged at a bottom of the spray box.

* * * * *